(12) United States Patent
Law

(10) Patent No.: US 7,412,401 B2
(45) Date of Patent: Aug. 12, 2008

(54) MESSAGING SYSTEM HAVING RECIPIENT PROFILING

(75) Inventor: Robert A. Law, Ridgefield, CT (US)

(73) Assignee: Pitney Bowes Inc., Stamford, CT (US)

( * ) Notice: Subject to any disclaimer, the term of this patent is extended or adjusted under 35 U.S.C. 154(b) by 55 days.

(21) Appl. No.: 11/476,301

(22) Filed: Jun. 28, 2006

(65) Prior Publication Data

US 2006/0247966 A1    Nov. 2, 2006

Related U.S. Application Data

(63) Continuation of application No. 09/588,443, filed on Jun. 6, 2000, now Pat. No. 7,072,845.

(51) Int. Cl.
*G05F 17/30* (2006.01)
(52) U.S. Cl. .................................................. 705/10
(58) Field of Classification Search ................ 705/10
See application file for complete search history.

(56) References Cited

U.S. PATENT DOCUMENTS

| | | | |
|---|---|---|---|
| 4,639,873 A | 1/1987 | Baggarly et al. | 364/466 |
| 4,725,718 A | 2/1988 | Sansone et al. | 235/495 |
| 4,734,865 A | 3/1988 | Scullion et al. | 364/478 |
| 4,752,950 A | 6/1988 | Le Carpentier | 379/106 |
| 4,797,830 A | 1/1989 | Baggarly et al. | 364/464.03 |
| 4,811,234 A | 3/1989 | Storace | 364/464.02 |
| 4,831,554 A | 5/1989 | Storace et al. | 364/519 |
| 4,873,645 A | 10/1989 | Hunter et al. | 364/479 |
| 4,882,675 A | 11/1989 | Nichtberger et al. | 364/401 |
| 4,959,795 A | 9/1990 | Christensen et al. | 364/464.03 |
| 5,008,827 A | 4/1991 | Sansone et al. | 364/464.02 |
| 5,024,153 A | 6/1991 | Bannister et al. | 101/91 |
| 5,043,908 A | 8/1991 | Manduley et al. | 364/478 |
| 5,053,955 A | 10/1991 | Peach et al. | 364/401 |

(Continued)

FOREIGN PATENT DOCUMENTS

EP    0944002 A1    9/1999

(Continued)

OTHER PUBLICATIONS

Maes Pattie: "Agents That Reduce Work and Information Overload." Communications of the Association for Computing Machinery, Association for Computing Machinery. pp. 30-40, 146, vol. 37, No. 7, Jul. 1994.

(Continued)

*Primary Examiner*—Romain Jeanty
(74) *Attorney, Agent, or Firm*—George M. Macdonald; Angelo N. Chaclas

(57) ABSTRACT

An information system includes a plurality of messaging systems, a data center and a control system. The plurality of messaging systems process respective messages intended for recipients. The data center is in operative communication with the plurality of messaging systems and stores transaction data associated with each respective message. The control system is in operative communication with the data center. The control system identifies selected transaction data from among the transaction data corresponding to a defined recipient and uses the selected transaction data to generate a recipient profile of messages intended for the defined recipient that have been processed by the plurality of messaging systems.

6 Claims, 3 Drawing Sheets

U.S. PATENT DOCUMENTS

| | | | | |
|---|---|---|---|---|
| 5,058,030 | A | 10/1991 | Schumacher | 364/478 |
| 5,072,400 | A | 12/1991 | Manduley | 364/478 |
| 5,168,804 | A | 12/1992 | Lee et al. | 101/99 |
| 5,177,687 | A | 1/1993 | Baggarly et al. | 364/464.03 |
| 5,274,696 | A | 12/1993 | Perelman | 379/89 |
| 5,283,731 | A | 2/1994 | Lalonde et al. | 364/401 |
| 5,321,604 | A | 6/1994 | Peach et al. | 364/401 |
| 5,329,578 | A | 7/1994 | Brennan et al. | 379/67 |
| 5,383,115 | A | 1/1995 | Lecarpentier | 364/554 |
| 5,384,708 | A | 1/1995 | Collins et al. | 364/464.02 |
| RE34,915 | E | 4/1995 | Nichtberger et al. | 364/401 |
| 5,454,038 | A | 9/1995 | Cordery et al. | 380/23 |
| 5,490,077 | A | 2/1996 | Freytag | 364/464.02 |
| 5,509,109 | A | 4/1996 | Kim et al. | 395/114 |
| 5,513,126 | A | 4/1996 | Harkins et al. | 364/514 A |
| 5,535,126 | A | 7/1996 | Mourgues | 364/464.02 |
| 5,636,346 | A | 6/1997 | Saxe | 395/201 |
| 5,689,642 | A | 11/1997 | Harkins et al. | 395/200.04 |
| 5,717,596 | A | 2/1998 | Bernard et al. | 364/464.02 |
| 5,724,521 | A | 3/1998 | Dedrick | 395/226 |
| 5,742,905 | A | 4/1998 | Pepe et al. | 455/461 |
| 5,754,939 | A | 5/1998 | Herz et al. | 455/4.2 |
| 5,761,648 | A | 6/1998 | Golden et al. | 705/14 |
| 5,774,554 | A | 6/1998 | Gilham | 380/51 |
| 5,781,901 | A | 7/1998 | Kuzma | 707/10 |
| 5,794,210 | A | 8/1998 | Goldhaber et al. | 705/14 |
| 5,819,241 | A | 10/1998 | Reiter | 705/408 |
| 5,822,739 | A | 10/1998 | Kara | 705/410 |
| 5,925,864 | A | 7/1999 | Sansone et al. | 235/375 |
| 5,948,061 | A | 9/1999 | Merriman et al. | 709/219 |
| 5,963,618 | A | 10/1999 | Porter | 379/88.17 |
| 6,026,397 | A | 2/2000 | Sheppard | 707/5 |
| 6,029,137 | A | 2/2000 | Cordery et al. | 705/1 |
| 6,064,995 | A | 5/2000 | Sansone et al. | 705/410 |
| 6,072,862 | A | 6/2000 | Srinivasan | 379/100.08 |
| 6,157,924 | A | 12/2000 | Austin | 707/10 |
| 6,173,043 | B1 | 1/2001 | Finnigan | 379/88.18 |
| 6,233,568 | B1 | 5/2001 | Kara | 705/410 |
| 6,243,375 | B1 | 6/2001 | Speicher | 370/352 |
| 6,275,849 | B1 | 8/2001 | Ludwig | 709/206 |
| 6,327,574 | B1 | 12/2001 | Kramer et al. | 705/14 |
| 6,330,079 | B1 | 12/2001 | Dugan et al. | 358/403 |
| 6,330,308 | B1 | 12/2001 | Cheston, III et al. | 379/88.04 |
| 6,330,550 | B1 | 12/2001 | Brisebois et al. | 705/75 |
| 6,463,462 | B1 | 10/2002 | Smith et al. | 709/206 |
| 6,611,842 | B1 | 8/2003 | Brown | 707/102 |
| 6,847,387 | B2 | 1/2005 | Roth | 345/811 |
| 2003/0105826 | A1* | 6/2003 | Mayraz | 709/206 |

FOREIGN PATENT DOCUMENTS

| | | |
|---|---|---|
| GB | 2 358 263 A | 7/2001 |
| WO | 96/14701 | 5/1996 |

OTHER PUBLICATIONS

R. Brodie: "The conditions and consequences of profiling in commercial and governmental situations." pp. 148-154, Wiring the World: The Impact of Information Technology on Society. Technology and Society, Jun. 1998 International Symposium, South Bend, Indiana.

Young-Woo Seo, et al., Association for Computing Machinery: "Learning User's Preferences by Analyzing Web-Browsing Behaviors." Proceedings of the 4th Annual Conference on Autonomous Agents. vol. Conf. 3, Jun. 3, 2000, pp. 381-387.

* cited by examiner

MESSAGING SYSTEM HAVING RECIPIENT PROFILING

CROSS REFERENCE TO RELATED APPLICATIONS

This application is a Continuation of commonly owned, U.S. patent application Ser. No. 09/588,443, now U.S. Pat. No. 7,072,845 filed Jun. 6, 2000, entitled MESSAGING SYSTEM HAVING RECIPIENT PROFILING by Robert A. Law, which is incorporated herein by reference in its entirety.

This application is related to the following commonly assigned applications: U.S. patent application Ser. No. 09/588,763, entitled INFORMATION DELIVERY SYSTEM FOR PROVIDING SENDERS WITH A RECIPIENT'S MESSAGING PREFERENCES, now U.S. Pat. No. 7,058,586 and U.S. patent application Ser. No. 09/588,853, entitled RECIPIENT CONTROL OVER ASPECTS OF INCOMING MESSAGES, now U.S. Pat. No. 6,690,773, both of which are specifically incorporated herein by reference.

FIELD OF THE INVENTION

This invention relates generally to messaging systems. More particularly, in the preferred embodiments, this invention is directed to a system including a plurality of messaging systems that retain information pertaining to discrete messages and a processing system for gathering the discrete messages and developing a profile about a recipient of the messages.

BACKGROUND

In all types of businesses, access to robust and accurate information is often seen as a key component of success. Businesses are constantly striving to learn more about their marketplace, customers and competitors. Therefore, ready access to reliable information is highly desirable.

The messaging industry is very rich in terms of the quantity and quality of information. Examples of messaging systems are: postage printing systems, inserters, shipping and logistics systems, electronic mail and the like. Historically, information that is readily available in this industry has been under utilized.

Therefore, there is a need for improvement in the collection and processing of information related to the messaging industry.

SUMMARY OF THE INVENTION

The present invention provides a system, method and data structure for improving the collection and processing of information related to the messaging industry. Generally, this is accomplished by collecting transaction data associated with the processing of messaging by a plurality of discrete messaging systems and organizing transaction data from the plurality of messaging systems corresponding to a selected recipient.

In accordance with the present invention, there is provided an information system including a plurality of messaging systems, a data center and a control system. The plurality of messaging systems process respective messages intended for recipients. The data center is in operative communication with the plurality of messaging systems and stores transaction data associated with each respective message. The control system is in operative communication with the data center. The control system identifies selected transaction data from among the transaction data corresponding to a defined recipient and uses the selected transaction data to generate a recipient profile of messages intended for the defined recipient that have been processed by the plurality of messaging systems.

In accordance with the present invention, a method of operating a data center and a data structure are also provided.

Therefore, it is now apparent that the present invention substantially overcomes the disadvantages associated with the prior art. Additional advantages of the invention will be set forth in the description that follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION

Figure 1:
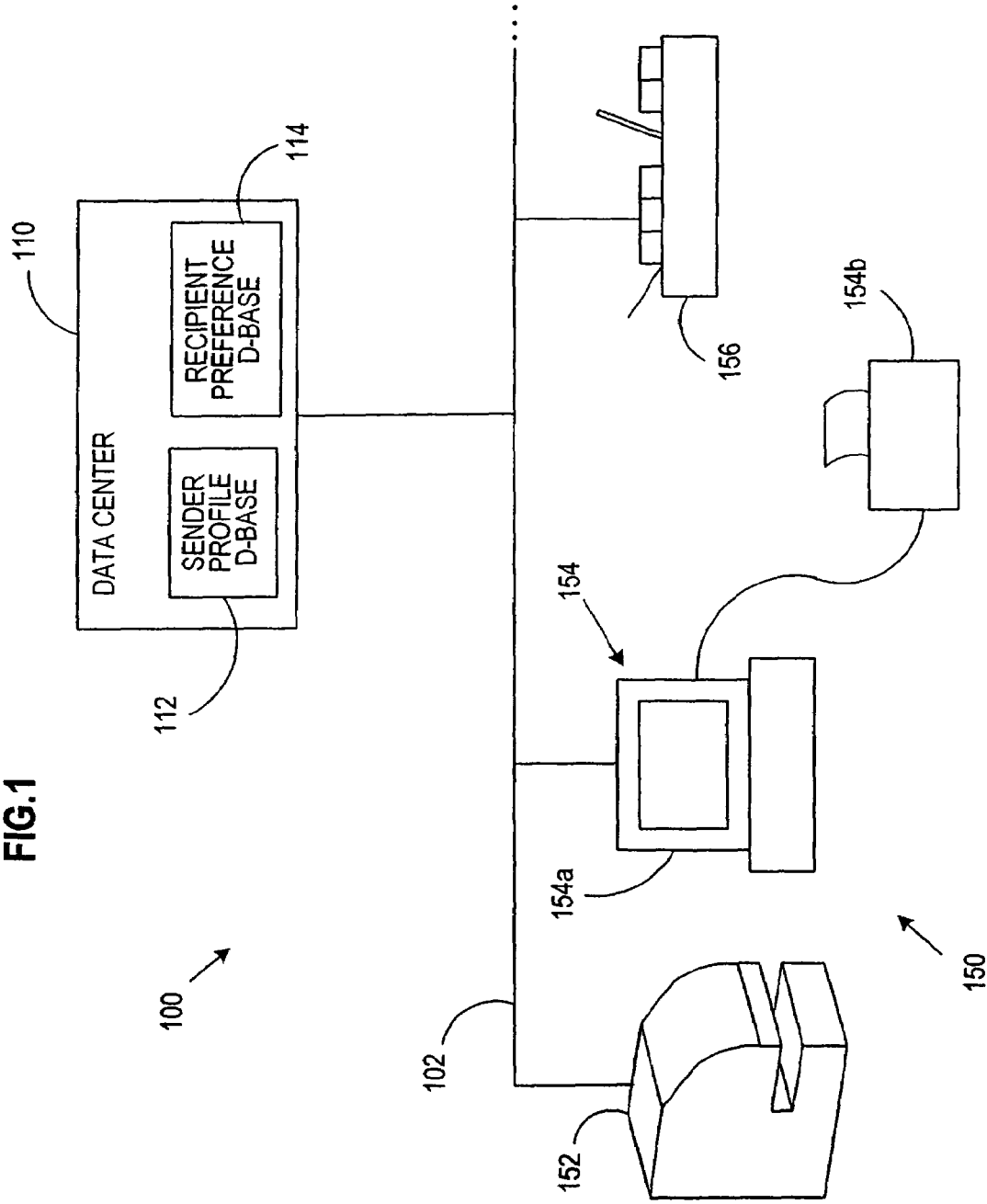
FIG. 1 is a simplified representation of an information system including a data center and a plurality of distributed messaging systems in electronic communication with the data center in which the present invention may be incorporated.

Referring to FIG. 1, an example of an information system 100 in which the present invention may be incorporated is shown. The information system includes a data center 110 in communication over any suitable communication network 102 (LAN, WAN, telephone line, Internet, etc.) with a plurality of remotely located (geographically dispersed) messaging systems 150. The messaging systems 150 may include any device that is utilized by a sender (not shown) to produce a message (not shown) intended for a recipient (not shown). Examples of messaging systems are: a traditional postage meter 152, such as the Personal Post™ meter; an open system postage meter 154, such as the ClickStamp™ online postage system employing a personal computer 154*a* and a dot matrix (laser, ink jet, thermal transfer, etc.) printer 154*b*; and an inserter 156, such as the 8 Series™ inserting system; all available from Pitney Bowes of Stamford, Conn. Still other examples of messaging systems are shipping and logistics systems (not shown), addressing systems, such as the AddressRight™ system available from Pitney Bowes of Stamford, Conn., electronic mail (not shown) and the like. Because messaging systems are well known, the descriptions have been limited for the sake of brevity to only that which is necessary to provide suitable background for an understanding of the present invention.

Generally, it is anticipated that the messaging systems 150 would be located primarily in business offices and in private residences and used for a variety of purposes, including message creation, addressing, output generation and/or delivery. The data center 110 is maintained and operated by an administrative agency (not shown), such as the supplier of the messaging systems 150, and may communicate with the messaging systems 150 in a variety of different ways. Those skilled in the art will recognize that not each messaging system 150 need utilize the same type of communication network 102 in contacting the data center 110. Furthermore, depending on the needs of each messaging system 150, the messaging systems 150 may or may not need full time access to the data center 110 to perform their respective tasks.

In conventional fashion, the messaging systems 150 are used by their respective operators to perform one or more of the steps in the messaging process (creation, addressing, output generation, delivery, etc.). For example, the traditional postage meter 152 and the open system postage meter 154 may be used to apply a postal indicia (not shown) on an envelope (not shown) that contains a letter (not shown) for delivery to a recipient (not shown). The postal indicia typically includes at least date and postage value data. The inserter 156 may be used to create, assemble, fold and/or insert a document (not shown) into an envelope (not shown) for subsequent delivery. Therefore, the inserter 156 may have information pertaining to the content of the envelope and the recipient of the envelope. In analogous fashion, the other types of messaging systems 150 all have access to various data about the messages that they process. Those skilled in the art will appreciate that the types of data available is quite varied and ever increasing as newer more intelligent products are being introduced.

Figure 2:
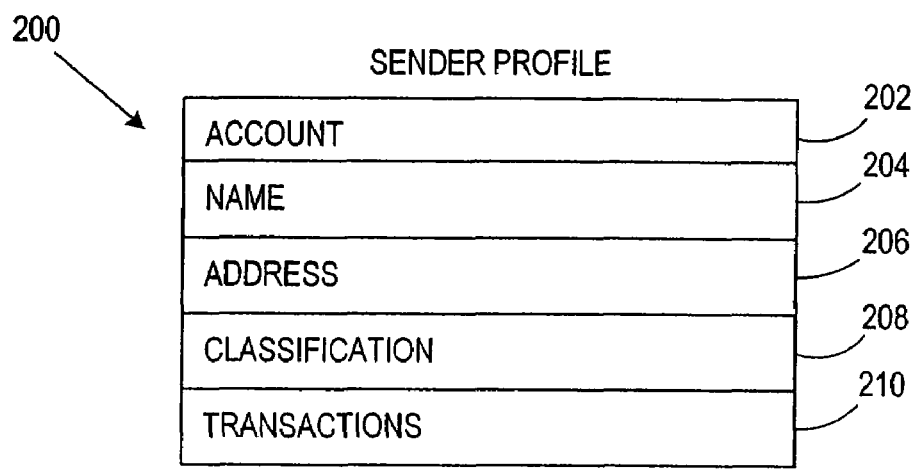
FIG. 2 is a schematic representation of a template for a sender profile describing a sender that operates a messaging system to process messages intended for a recipient in accordance with the present invention.

Referring to FIG. 2, in view of the structures of FIG. 1, a sender profile template 200 describing a sender (not shown) that operates a messaging system 150 to process messages intended for a recipient (not shown) is shown. The administrative agency establishes a sender profile 200 for each sender (owner, operator, etc.) utilizing a single messaging system 150 or a group of messaging systems 150. The sender profile 200 may be established at any convenient time, such as installation of the first messaging system 150 from the administrative agency. The sender profile 200 may be stored in the data center 110 in a sender profiles database 112 and includes sender account identification data 202, sender name data 204, sender address data 206, sender classification data 208 and sender transaction data 210. The sender identification data 202 may be an account name, account number or any identifying information that differentiates one message sender from another. The sender name data 204 includes information about the entity's name that is using the messaging system 150. The sender address data 206 includes information about a physical or e-mail address for billing and/or other contact purposes. The sender classification data 208 includes information about what type of industry segment best describes the sender's activities. This may be commercial, residential or some combination of both. One system available for use with respect to the sender classification data 208 is the Standard Industry Code (SIC) system that assigns SIC numbers for a variety of well known industry segments. As examples, automobile rental companies would be assigned a SIC number in the range of 2100 to 2199, while automobile dealerships would be assigned a SIC number in the range of 2400-2499 and service stations would be assigned a SIC number in the range of 4000 to 4099. Still other SIC numbers exist for financial institutions, health care providers, legal service providers, professional associations, utility service providers, governmental agencies and a variety of other industry segments. The sender transaction data 210 includes information collected by the sender's messaging system 150 related to the various messages that have been processed by the sender's messaging system 150. In the preferred embodiment, a transaction record (not shown) will be created for each message that includes all the information available concerning the processing (creation, addressing, output generation, delivery, etc.) of the message.

Figure 3:
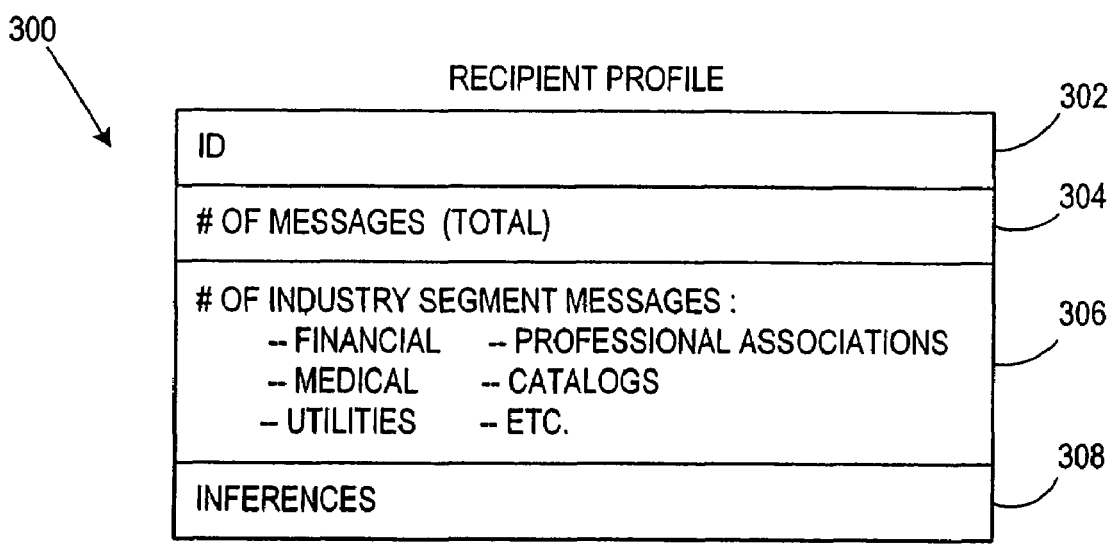
FIG. 3 is a schematic representation of a template for a recipient profile of a recipient of messages processed by various messaging systems in accordance with the present invention.

Referring to FIG. 3, in view of the structures of FIG. 1, a recipient profile template 300 describing a recipient (not shown) that receives messages processed by the messaging systems 150 to process messages intended for a recipient (not shown) is shown. The administrative agency establishes a recipient profile 300 at any convenient time, such as: a request for information about the recipient or some other predetermined event. The recipient profile 300 may be stored in the data center 110 in a recipient profiles database 114 and includes recipient identification data 302, a total number of messages received 304, segmentation data (matrix, table, statistical sampling, etc.) 306 of the types and distribution of senders that originated those messages and inference data 308. The recipient may be classified as an individual, an address (as if for a household) or business name, the recipient identification data 302 may be an individual person's name, a residential address, a commercial address or a business name. The recipient identification data 302 is purely dependent upon about what type of entity information is sought. The total number of messages received 304 is simply a total of the number of messages received by the defined recipient over any selectable period of time. Using the sender classification data 208 and/or the transaction data 210 described above, the segmentation data 306 breaks down the total of the number of messages received 304 and organizes them into categories, such as by industry segment, depending on what type of entity sent the message (who the sender is) and/or what type of message was sent (letter, package, e-mail, catalog, special delivery). This segmentation data 306 may be further analyzed as described in greater detail below to develop the inference data 308 also described in greater detail below.

Figure 4:
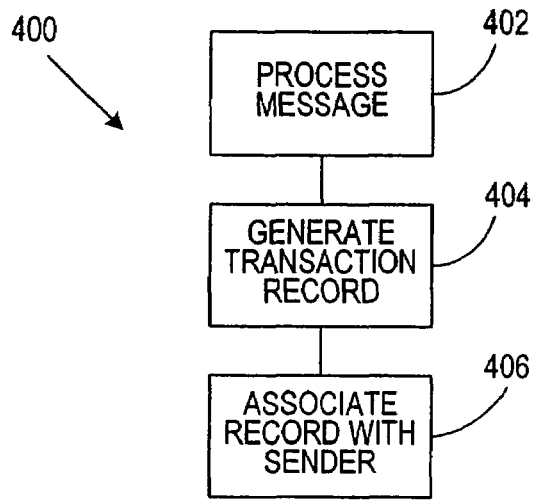
FIG. 4 is a routine for gathering and organizing data collected from the plurality of distributed messaging systems for use in developing the recipient profile in accordance with the present invention.

With the structure of the information system 100 described as above, the operational characteristics will now be described with respect to how transaction data 210 is obtained and recipient profiles 300 are generated. Referring primarily to FIG. 4 while referencing the structure of FIGS. 1, 2 and 3, a flow chart of a transaction routine 400 in accordance with the present invention is shown. Generally, the transaction routine 400 obtains transaction information from the messaging system 150 and associates it with a corresponding sender profile 200.

At 402, the transaction routine 400 commences when a messaging system 150 begins to process a message. As described above, depending on the type of messaging system 150 being employed, the message processing may involve a variety of functions. Next, at 404, a transaction record (not shown) is generated that reflects the all information available concerning the processing (creation, addressing, output generation, delivery, etc.) of the message. Here again, depending on the type of messaging system 150 being employed, the transaction record may include a variety of different information. For example, a transaction from a postage metering system 154 may include: date, sender, recipient name, recipient address, postage amount, special services (insurance, return receipt request, etc.) and the like. Those skilled in the art will now appreciate that the transaction record may contain as much information as is available from the messaging system 150. Next, at 406, the transaction record is associated with the sender by storing it in the transaction data 210 for a particular sender profile 200 corresponding to the sender. Depending on the type of messaging system 150, the storage of the transaction record into the transaction data 210 may occur as part of the messaging process if the messaging system 150 is in communication with the data center 110 or occur during a subsequent communication session between the messaging system 150 and the data center 110. Those skilled in the art will now appreciate that over a period of time the transaction data 210 contains a log of transaction records associated with the various messages processed by the senders' various messaging systems 150. Furthermore, a plurality of sender profiles 200 are eventually established at the data center 110 where each sender profile 200 contain respective transaction data 210 indicative of its message processing activities.

Figure 5:
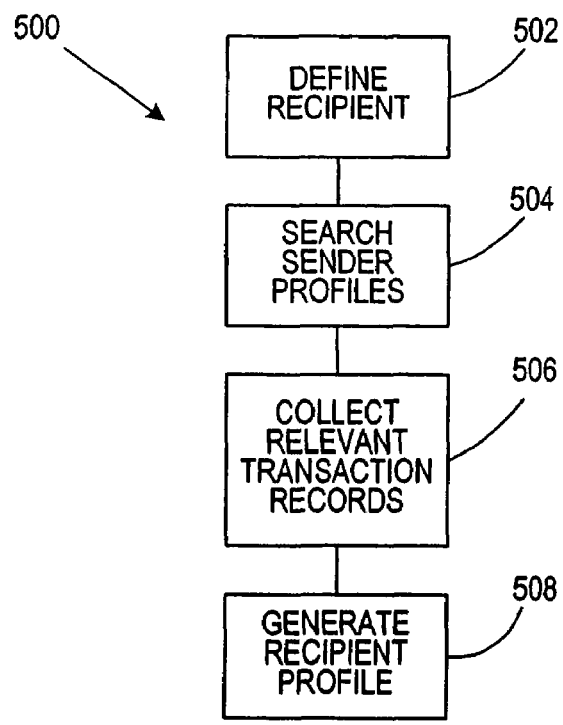
FIG. 5 is a routine for generating a recipient profile from the collected from the plurality of distributed messaging systems for use in drawing inferences about the recipient in accordance with the present invention.

With the transaction routine 400 described as above, the utilization of the transaction data 210 that has been collected will now be described. Referring primarily to FIG. 5 while referencing the structure of FIGS. 1, 2 and 3 and the flow chart of FIG. 4, a flow chart of a recipient profiling routine 500 in accordance with the present invention is shown. Generally, the recipient profiling routine 500 is run at the data center 110 and obtains transaction data 210 from each of the plurality of sender profiles 200 that related to a selected recipient.

At 502, the recipient profiling routine 500 commences when a selected recipient is defined. The recipient may be defined according to what type of entity information is sought. The recipient may be defined as an individual, a residential address (to obtain entire household information), a business name or a business address, any combination of these identifiers or some other desired entity. This recipient definition serves as the recipient identification data 302 in the recipient profile 300. Next, at 504, the transaction data 210 from each of the sender profiles 200 containing the log of respective transaction records associated with the various messages processed by the senders' various messaging systems 150 is searched. Next, at 506, any relevant transaction records that meet the recipient definition are identified. Next, at 508, the relevant transaction records are used to generate the segmentation data 306 for a selected recipient profile 300. As discussed above, the selected recipient profile 300 provides useful insight into the messaging characteristics of the recipient by revealing various information about the defined recipient's incoming messaging activity, such as: the types of senders (financial, medical, utility, retailer, automotive, professional association, etc.) that communicate with the recipient, the frequency (weekly, monthly, quarterly, randomly, etc.) of those communications and the types of messages (1st class mail, bulk rate mail, priority mail, e-mail, package, etc.).

Those skilled in the art will recognize that various modifications can be made to the recipient profiling routine 500 described above. For example, in the alternative, an entity may be defined according to the amount of messages received, the type of messages received, the type of senders or any combination thereof. The recipient definition may seek any recipient receiving more than a given number of messages from a financial institution over a given time period. In this example, several recipients may meet the definition. In this case, a recipient profile 300 is developed for each qualifying recipient.

Referring to FIGS. 1-5, potential uses for the generated recipient profile 300 will now be described. Generally, the segmentation data 306 is utilized to develop inferences about the recipient. For example, if the defined recipient is an individual, then inferences (informed guesses) as to the recipient's characteristics, preferences and interests may be made. A recipient's characteristics may include: financial status, health status, employment status, religious affiliation, family status, immutable characteristics (age, gender, ethnicity, etc.) and the like. To the extent practicable, the inferences may be developed by an expert system or other form of artificial intelligence executed by the data center 110 or even a human being.

Inferences may be drawn in a variety of different ways. To provide demonstrative illustrations, a discussion of several of the sample characteristics identified above will be provided. A recipient that receives many messages (i.e. statements) from a large number of brokerage firms, mutual fund companies and the like is more likely to have a higher net worth (due to an increased number of financial assets) than a recipient that receives no such messages. A recipient that receives many messages (i.e. statements/bills/reports) from a large number of health care providers is more likely to have a medical condition requiring treatment than a recipient that receives no such messages. A recipient that receives recurring messages from governmental support agencies (social security, unemployment compensation, food stamps, etc.) has a lower chance of being steadily employed than a recipient that receives no such messages. This may also contribute to the financial status inference. Recurring messages from a particular organization may indicate that the recipient is affiliated with the organization. Those affiliations can provide insight as to various recipient characteristics. As examples, recurring messages from Our Lady of Sacred Heart Church may indicate that the recipient is catholic; recurring messages from the National Association of Retired Persons (NARP) may indicate that the recipient is over the age of fifty-five (55) and retired; recurring messages from the Parent Teachers Association (PTA) or a public/private school may indicate that the recipient has school age children; recurring messages from professional associations (American Bar Association) may indicate an interest (law) and/or occupation (attorney) of the recipient. Those skilled in the art will recognize that countless other examples exist for each of the demonstrative characteristics described above.

Inferences may also be drawn as to the recipient's messaging preferences. Generally, a recipient's messaging preferences may include: desired type of message (physical mail, e-mail, etc.) and frequency of receipt of recurring messages. To provide demonstrative illustrations, a discussion of the preferences identified above will be provided. A recipient that receives all messages in physical form is more likely to prefer physical messages than a recipient that receives a large percentage of messages in electronic form. Recurring messages, such as statements, from a various senders that are all received on a monthly basis may indicate a preference for monthly updates as opposed to quarterly or annual updates. Those skilled in the art will recognize that still other opportunities to draw inferences exist.

Inferences may also be drawn as to the recipient's interests (hobby, vocation, etc.). Generally, a recipient's messages provide insight into the subject matter areas that occupy the recipient's time. To provide demonstrative illustrations, a discussion of several examples revealing how interests may be inferred will be provided. A recipient that receives a variety of seed and nursery catalogs from different senders is likely to be interested in gardening. A recipient that receives numerous account transaction statements may be interested in investing. A recipient that receives recurring messages from the National Rifle Association (NRA) may be interested in firearms, target shooting and the like. Here again, those skilled in the art will recognize that still other opportunities to draw inferences exist.

Once the inferences have been drawn, the recipient profile 300 is updated by storing the inferences in the inference data 308. In this manner, the searching and analyzing of transaction records need not be performed each time information is sought about the recipient. However, the searches should be conducted periodically to ensure that the no changes have occurred and the inferences are still valid.

Based on the above description and the associated drawings, it should now be apparent that the present invention improves the collection and processing of information related to the messaging industry. By gaining a better understanding of the recipient, the industry can provide better service and bring items of interest to the attention of the recipient more efficiently through targeted advertising. Once the inferences are drawn, they may be put to use by industry in a variety of different ways to allow industry to communicate more effectively with the recipient.

Many features of the preferred embodiment represent design choices selected to best exploit the inventive concept as implemented in a particular messaging environment as pertaining to individual private recipients. However, those skilled in the art will recognize that various modifications can be made without departing from the spirit of the present invention to adapt the concepts of the present invention to address situations where the recipient is a business. For example, a wide variety of database management tools exist that can facilitate the collection of the transaction records and the generation of the recipient profiles. The exact manner in which these activities occur is subject to great variation due to practical design choices of the hardware, software, communications and data involved. As another example, the recipient profiles 300 need not be generated in response to a request for information about a particular recipient. Alternatively, a recipient profile 300 could be generated at any predetermined event, such as: automatically for each recipient or after a recipient has received a given number of messages.

Therefore, the inventive concept in its broader aspects is not limited to the specific details of the preferred embodiments described above, but is defined by the appended claims and their equivalents.

What is claimed is:

1. A data processing system, comprising:
a plurality of messaging systems operated by a plurality of message senders for processing respective messages intended for recipients;
a data center data processing system in operative communication with the plurality of messaging systems for storing transaction data associated with each respective message processed by the messaging systems intended for the recipients;
a control system in operative communication with the data center for:
identifying selected relevant transaction data from among the transaction data corresponding to a defined recipient; and
using the selected relevant transaction data to generate a recipient profile of messages intended for the defined recipient that have been processed by the plurality of messaging systems, wherein:
the recipient profile includes segmentation information developed from the selected transaction data that organizes the messages intended for the defined recipient into categories, wherein:
the control system is further for:
using the segmentation information to develop inferences about the defined recipient in the recipient profile, wherein:
the plurality of messaging systems are operated by respective senders;
each respective sender has associated classification data indicating an industry segment that describes the respective sender's activities; and
the control system is further for:
using the sender classification data to store an indication in the recipient profile of types of senders that originated the messages intended for the defined recipient.

2. The system of claim 1, wherein:
the inferences are developed from the sender classification data and include one or more of the following insights: characteristics, preferences and interests of the defined recipient.

3. A method of operating a data center data processing system, the method comprising:
communicating with a plurality of messaging systems operated by a plurality of message senders, the messaging systems for processing respective messages intended for recipients;
storing transaction data associated with each respective message;
identifying selected relevant transaction data from among the transaction data corresponding to a defined recipient; and
using the selected relevant transaction data to generate a recipient profile of messages intended for the defined recipient that have been processed by the plurality of messaging systems, further comprising:
using the selected transaction data to generate segmentation information that organizes the messages intended for the defined recipient into categories, further comprising:
using the segmentation information to develop inferences about the defined recipient in the recipient profile, wherein:
the plurality of messaging systems are operated by respective senders; and
each respective sender has associated classification data indicating an industry segment that describes the sender's activities; and
further comprising:
using the sender classification data to store an indication in the recipient profile of types of senders that originated the messages intended for the defined recipient.

4. The method of claim 3, wherein:
the inferences are developed from the sender classification data and may include one or more of the following insights: characteristics, preferences and interests of the defined recipient.

5. A memory system accessible by an application program being executed on a data processing system, comprising:
transaction data associated with a plurality of messages received from a plurality of message senders, the transaction data representative of respective messages processed by a plurality of messaging systems;
selected relevant transaction data from among the transaction data corresponding to a defined recipient; and
recipient profile data corresponding to the selected relevant transaction data from messages intended for the defined recipient that have been processed by the plurality of messaging systems, further comprising:

segmentation data developed from the selected transaction data that organizes the messages intended for the defined recipient into categories, further comprising:

inference data about the defined recipient developed from the segmentation data, further comprising:

classification data, associated with respective senders that operate the plurality of messaging systems, indicating an industry segment that describes the respective senders' activities; and an indication in the recipient profile, based on the classification data, of types of respective senders that originated the messages intended for the defined recipient.

6. The memory system of claim 5, wherein:

the inference data is developed from the classification data and may include one or more of the following insights: characteristics, preferences and interests of the defined recipient.

* * * * *